(12) United States Patent
Chen et al.

(10) Patent No.: US 8,554,907 B1
(45) Date of Patent: Oct. 8, 2013

(54) REPUTATION PREDICTION OF IP ADDRESSES

(75) Inventors: RungChi Chen, Cingshuei Township (TW); Larrick Chen, Yuanlin Township (TW); Porter Chang, Keelung (TW)

(73) Assignee: Trend Micro, Inc., Tokyo (JP)

( * ) Notice: Subject to any disclaimer, the term of this patent is extended or adjusted under 35 U.S.C. 154(b) by 138 days.

(21) Appl. No.: 13/027,778

(22) Filed: Feb. 15, 2011

(51) Int. Cl.
*G06F 7/20* (2006.01)
*G06F 7/02* (2006.01)

(52) U.S. Cl.
USPC ............ 709/224; 709/223; 370/242; 370/252

(58) Field of Classification Search
None
See application file for complete search history.

(56) References Cited

U.S. PATENT DOCUMENTS

| | | | |
|---|---|---|---|
| 7,702,806 B2 * | 4/2010 | Gil et al. | 709/234 |
| 7,970,934 B1 * | 6/2011 | Patel | 709/244 |
| 2005/0022008 A1 * | 1/2005 | Goodman et al. | 713/201 |
| 2005/0193073 A1 * | 9/2005 | Mehr et al. | 709/206 |
| 2006/0026675 A1 * | 2/2006 | Cai et al. | 726/22 |
| 2006/0294588 A1 * | 12/2006 | Lahann et al. | 726/23 |
| 2007/0220607 A1 * | 9/2007 | Sprosts et al. | 726/24 |
| 2009/0265786 A1 * | 10/2009 | Xie et al. | 726/24 |
| 2010/0017487 A1 * | 1/2010 | Patinkin | 709/206 |
| 2010/0161537 A1 * | 6/2010 | Liu et al. | 706/46 |
| 2010/0268818 A1 * | 10/2010 | Richmond et al. | 709/224 |
| 2011/0055923 A1 * | 3/2011 | Thomas | 726/23 |
| 2011/0167030 A1 * | 7/2011 | Bremler-Barr et al. | 706/48 |
| 2011/0173142 A1 * | 7/2011 | Dasgupta et al. | 706/12 |

* cited by examiner

*Primary Examiner* — Hanh N Nguyen
*Assistant Examiner* — Joshua A Kading
(74) *Attorney, Agent, or Firm* — Beyer Law Group LLP

(57) ABSTRACT

Daily query counts for e-mail messages sent from a number of IP addresses having unknown reputations are collected and logged, and optionally plotted. The logged query count data may optionally be normalized. The normalized query count data may also be plotted. The normalized data is divided into regions (numerically or graphically). Next, the divided regions are tagged (symbolically or graphically) with unique, symbolic identifiers such as letters, numbers, symbols or colors. Patterns for each unknown IP address are formed based upon the tagged regions. Common good and bad patterns are also identified for known good and bad IP addresses. The reputation of these unknown IP addresses are then predicted using these identified good and bad patterns using a suffix tree (for example). Finally, an output identifying the determined reputations of these unknown IP addresses is generated and output.

20 Claims, 13 Drawing Sheets

Query Count by Date

| IP Address | 2010/7/1 | 2010/7/2 | 2010/7/3 | 2010/7/4 | 2010/7/5 | 2010/7/6 | 2010/7/7 |
|---|---|---|---|---|---|---|---|
| 12.130.136.134 | 775 | 104 | 95 | 79 | 92 | 75 | 6427 |
| 12.130.137.222 | 61 | 700 | 20148 | 757 | 11 | 33765 | 1101 |
| 12.14.60.12 | 20 | 21 | 0 | 2 | 6 | 36 | 47 |
| 12.16.237.18 | 21 | 10 | 21 | 16 | 57 | 29 | 16 |
| 128.121.146.142 | 8053 | 6526 | 5292 | 5336 | 6680 | 7474 | 6852 |
| 128.121.146.144 | 7872 | 6366 | 5338 | 5488 | 6272 | 7397 | 6847 |
| 128.121.146.153 | 7916 | 6463 | 5361 | 5329 | 6519 | 7471 | 6889 |
| 156.21.1.49 | 18879 | 1991 | 26 | 18 | 38 | 80 | 232 |
| 168.93.77.75 | 0 | 0 | 0 | 0 | 0 | 0 | 0 |
| 17.148.16.90 | 2526 | 1889 | 843 | 694 | 1542 | 2241 | 2079 |
| 17.148.16.95 | 2382 | 1866 | 864 | 771 | 1574 | 2067 | 1977 |
| 17.254.6.183 | 939 | 1085 | 1033 | 895 | 1072 | 1161 | 981 |

*FIG. 1*
Partial Customer Query Log

Normalized Query Log

IP Address Behavior Patterns — 500

208.85.53.43; X A C A D C D F D B Y A D A D E — 502
208.85.53.44; C X A Y B B F D Y A D D A D E — 504
208.85.53.45; X A A C D C F D Y A B B B E D — 506
208.85.53.47; Y A D Y D C E A C X Y F B A D D — 508
208.85.53.49; B A C Y D D A F D Y C B X D D E — 510
208.85.53.5; X A C A B D F D Y Y D B A D E — 512

208.85.53.43;DCDDDDCCCDDDCXBBCDDCCCCDDCCCCXD — 522
208.85.53.44;DDDDDXDDDDDDBCDDDDDDDDDDAABD — 524
208.85.53.45;DDDDDDDCDXDDDDDDDDCCDDDDDDDX — 526
208.85.53.47;DCDDABDDXDDCCDBBDDCDDBCDDDDD — 528
208.85.53.49;DCDDDADDCDDDADDCDDXDCDDBDDDD — 530
208.85.53.5;DDDDDACBDDBCBCDDDCBBDDDDCCDDDC — 532

*FIG. 7*

Good Behavior Patterns 208.112.31.209:CEEECBCCEECCBCEECCCCEECCCCCEEC
208.113.96.229:CEEDCCCEECBCCEECCCCEECCCCCEEC
208.114.50.90:CEEDCCCEEBCCCEECCCCEECCCCCEEC
208.123.68.99:CEECBCCCEECCCEECCCCEECCCCEEC
208.123.79.45:CEEECBCCEECCCEECCCCEECCCCEEC

FIG. 10

Bad Behavior Patterns 208.211.69.1;BCBDBBDBABDCDDDDDDDDDDDDDCADD
208.211.69.2;ACBDBBDBABDCDDDDDDDDDDDDDABAB
208.211.69.3;BCBDBDDBABDCDDDDDDDDDDDDDCCCC
208.211.69.4;BCBDBBDBABDCDDDDDDDDDDDDDCCCC
208.211.69.5;BCBDBBDBABDCDDDDDDDDDDDDDCCCC

FIG. 11

REPUTATION PREDICTION OF IP ADDRESSES

FIELD OF THE INVENTION

The present invention relates generally to combating electronic mail spam. More specifically, the present invention relates to predicting the reputation of an IP address based upon its traffic activities.

BACKGROUND OF THE INVENTION

Electronic mail spam is becoming a greater problem and companies are demanding better techniques for addressing the problem. While some companies rely upon spam filters, blacklists, etc., at the enterprise level in order to delete spam e-mail as it comes in, some situations require a stronger countermeasure. Aggressive spammers will often use a deluge of spam in order to attack a company, and it is desirable to identify the computers used by the spammers and their corresponding IP (Internet Protocol) addresses so that the spam may be blocked.

One technique that is known is the use of a honey pot. A honey pot is a trap set to detect, deflect, or in some manner counteract attempts at unauthorized use of information systems. Generally, a honey pot is a computer that appears to be part of a network, but is actually isolated and monitored, and which seems to contain information or a resource of value to attackers. One may create a honey pot program that masquerades as a computer resource easily abused in order to discover spammer activity. Honey pots can be a powerful countermeasure to abuse from spammers. For example, a honey pot can reveal the apparent IP addresses of the spammer's computers and can provide bulk spam capture, which enables an operator to determine a spammer's URLs (Universal Resource Locators) and response mechanisms. It is also possible to determine the e-mail addresses spammers use as targets for their test messages, which are the tool they use to detect open relays.

Nevertheless, even when honey pots are used they might not be able to identify all malicious computers that might be in use by spammer. It would be desirable to be able to predict the reputation of a computer or its IP address in order to thwart future spam attacks.

SUMMARY OF THE INVENTION

To achieve the foregoing, and in accordance with the purpose of the present invention, a prediction technique is disclosed that predicts the reputation of unknown IP addresses using patterns from known good and bad IP addresses.

The approach attempts to find behavior patterns of known good and bad IP addresses; these known good and bad patterns may then be used to predict the behavior of unknown IP addresses. The approach is different from traditional anti-spam techniques. One reason is that the predicted behavior of a computer server (such as a mail transfer agent) is not solely based upon suspected spam activities of that computer; the predicted behavior depends upon matching to known good and bad behavior patterns of other computer servers. Predicting a reputation of an IP address is not a one-time "snapshot." The prediction is based upon daily query patterns that may be analyzed on a continuous basis.

One advantage is that efficiency is improved. Data collected by customers concerning e-mail servers that is normally not available to an antivirus service provider can be analyzed to improve the detection rate and reduce false positives within any suitable e-mail reputation service. Thus, computer servers having IP addresses that are predicted to be malicious can be identified more efficiently. The results will be more reliable and believable because the input data comes directly from customer's activities, not from hypothetical models. Costs are reduced because it is not necessary to spend more money developing additional honey pots; the input data comes directly from customers.

In one embodiment of the invention the daily query counts for e-mail messages are collected and logged. This data may be plotted. The logged query count data may optionally be normalized. The normalized query count data may also be plotted. The normalized data is divided into regions (numerically or graphically). Next, the divided regions are tagged (symbolically or graphically) with unique, symbolic identifiers such as letters, numbers, symbols or colors. Patterns for each unknown IP address are formed based upon the tagged regions. Common good and bad patterns are also identified for known good and bad IP addresses. The reputation of these unknown IP addresses are then predicted using these identified good and bad patterns using a suffix tree (for example). Finally, an output identifying the determined reputations of these unknown IP addresses is generated and output.

BRIEF DESCRIPTION OF THE DRAWINGS

The invention, together with further advantages thereof, may best be understood by reference to the following description taken in conjunction with the accompanying drawings in which:

FIG. 1 is a partial customer query log representing the data from any number of customers.

FIG. 7 shows the development of patterns for unknown IP addresses.

FIG. 10 is an example of daily query count behavior patterns obtained from known, good mail transfer agents.

FIG. 11 is an example of daily query count behavior patterns obtained from known, bad mail transfer agents.

DETAILED DESCRIPTION OF THE INVENTION

Figure 2:
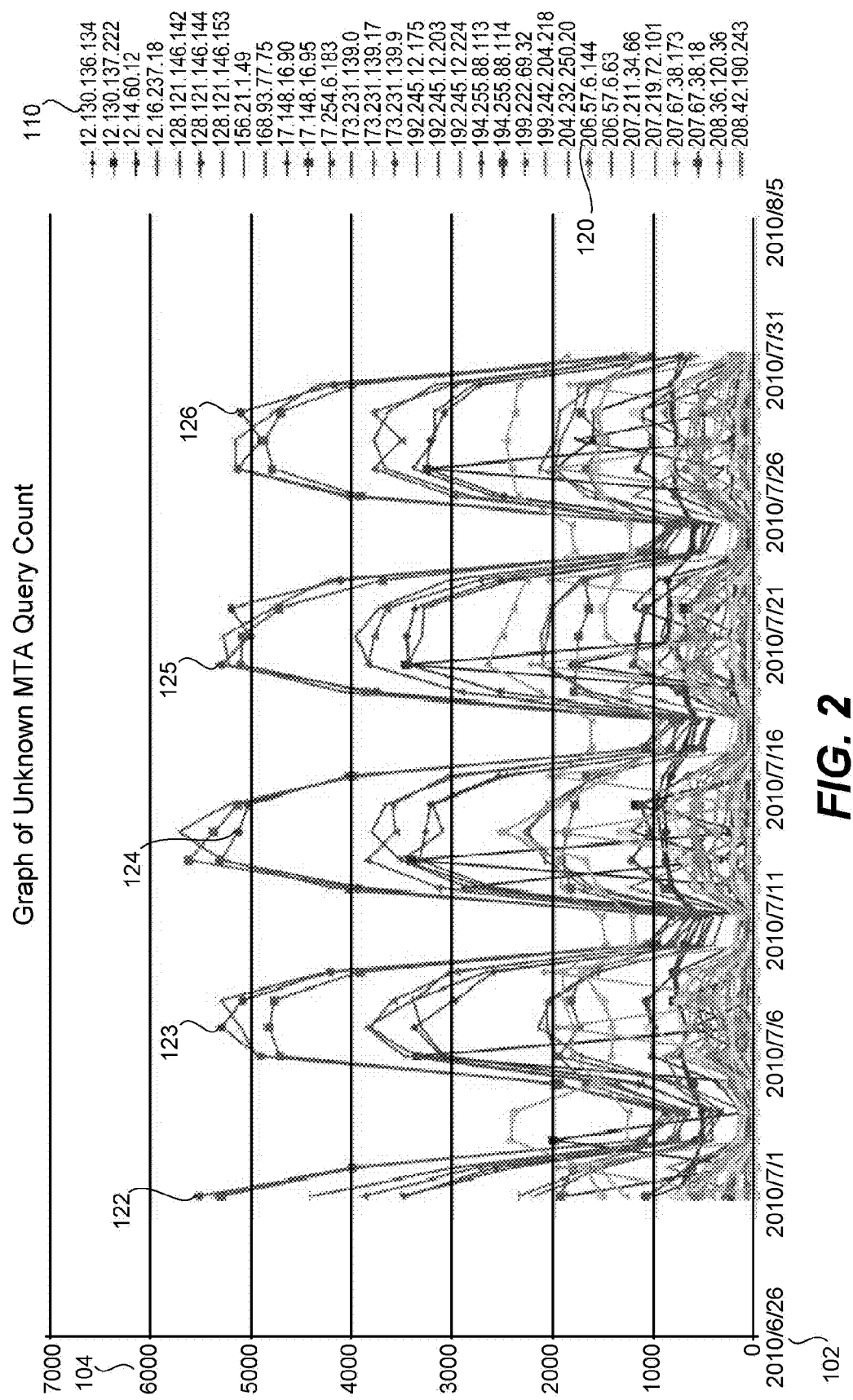
FIG. 2 is a graph of query counts over a time period showing total queries for all customers of a number of IP addresses.

As mentioned above, it would be desirable to predict the reputation of an IP address that is otherwise unknown. Such a technique would be useful within an e-mail reputation service (ERS) implemented by an antivirus service provider on behalf of its customers. The below example uses an e-mail reputation service, however the invention is equally applicable to analysis of domains, server computers, URLs—virtually any type of network traffic that can be logged on a per computer basis and then transformed into a sequence as will be described below.

As known in the art, an IP address (Internet protocol address) is a numerical label assigned to each device (such as a computer or printer) that uses the Internet Protocol for communication over a computer network. While Internet Protocol version 4 has been in use for some time, version 6 is now being deployed and the present invention contemplates the use of any such suitable protocol for an IP address. Static IP addresses refer to a persistent label for a particular computer, while a dynamic IP address refers to situations in which a computer's IP address is periodically reassigned. The present invention will apply to static IP addresses and to dynamic addresses as well.

It is realized that the reputation of an unknown IP address may be predicted using its network traffic data. By unknown, this means that it is unknown whether or not the IF address is in use by a spammer, and in particular, it may mean that no activities have been detected by this IP address in a honey pot. In other words, it is unknown whether the computer identified by the IP address is malicious or not. It is further realized that any other network traffic data associated with an IP address such as Internet traffic quantities, spam activities, etc., may be used to predict the reputation of a particular computer such as a Web server, a mail transfer agent (MTA), or other. In general, any network data that can be transformed into graphs such as those shown in FIGS. 2, 8 and 9 (for example) can benefit from the invention in order to group unknown, good, and bad behaviors. Then, the unknown behaviors can be predicted based upon the known good and the known bad behaviors.

Overview Example

Consider a mail transfer agent (MTA) computer as an example of the inventive technique. Traditionally, most spam countermeasures implemented by antivirus service providers attempt to identify spammers and their computers by setting a honey pot or by soliciting feedback from customers in order to identify an MTA as being good or bad. If this evidence indicates that an MTA is associated with a large volume of spam then the MTA may be classified as malicious, while an MTA associated with zero or low volume spam may be classified as benign. One limitation with this approach involves focusing upon interaction of the MTA with a honey pot. An MTA may be used to send spam to attack a particular company but might not be identified by any honey pot as being malicious.

It is further realized that an antivirus service provider (for example, TREND MICRO INC.) may very well have logs of MTA behavior obtained from its customers, including logs of known good MTAs, known bad MTAs and even unknown MTAs. An unknown MTA typically means a particular MTA has not been identified within the activities in any honey pot or other service. The logs from known good and bad MTAs may be retrieved and the behavior patterns found in those logs may then be used to predict the reputation of the unknown MTAs. This technique improves upon earlier prediction techniques that relied upon the use of honey pots, improves the detection rates of malicious computers and IP addresses, reduces false positives, and generally improve the performance of an e-mail reputation service.

E-Mail Reputation Service Example

FIG. 1 is a partial customer query log 10 representing the data from any number of customers. In this example, an antivirus service provider provides an e-mail reputation service that attempts to determine whether messages received by its clients are legitimate or not. Each time a customer receives an e-mail message from a particular IP address, it queries the antivirus service provider to ask whether the message (and its sending IP address) is legitimate or not. There may be dozens, hundreds or even thousands of customers whose query data is aggregated in the query log. Log 10 is a partial query log in that it only represents one week of daily data, may not list all IP addresses that are queried, and may not include all customers.

The IP address column 20 is the sending IP address of a particular computer such as an e-mail server or mail transfer agent that has sent an e-mail message to one of the customers. Columns 32-44 represent a daily log of the number of all e-mail messages received by all customers from a particular IP address. For example, reference numeral 52 shows that on Jul. 6, 2010 there were 7,474 e-mail messages received by all customers that originated at the IP address 128.121.146.142. These messages resulted in 7,474 queries sent to the antivirus service provider concerning IP address 128.121.146.142. Based upon this data, it is unknown whether the particular computer associated with each IP address is legitimate or not (i.e., a spammer or not). It should be noted that while some IP addresses send many thousands of e-mail messages each day, some IP addresses send very few messages or, apparently, zero messages daily.

Of course, it is possible to aggregate and record this data without necessarily requiring each customer to send a query to the antivirus service provider. An individual customer may aggregate its own data in which case the present invention would be applicable to that single customer's data, or, the data of all customers may be aggregated into a query log without necessarily requiring that each customer query the antivirus service provider. The below description explains how the reputation of each of these IP addresses may be predicted based upon this query log data.

FIG. 2 is a graph of query counts over a time period showing total queries for all customers of a number of IP addresses. At this point in time, the reputation of these IP addresses (and of each MTA) is unknown. In this example, daily data is logged for the month of July (x-axis 102) and the number of daily query counts for each IP address ranges from zero to about 55,000 (y-axis 104). Column 110 lists each IP address for which data is provided in the graph; for example, IP address 120 is shown having query count peaks at 122-126. Each IP address represented in the graph may be represented by a unique color, a unique symbol, or combination of both. Although this graph is not in color, it is intended that the plot of each IP address is distinct from the others in some manner.

The graph of FIG. 2 is the plot of data from a query log such as the partial log shown in FIG. 1. Although in this example, the plot in FIG. 2 does not represent the data from the partial log of FIG. 1 as the plot of FIG. 2 is more complete. It should be noted that while a graph is useful in understanding, visualizing and perhaps implementing the present invention, it is not strictly necessary to plot the data as shown in order to implement the present invention. FIG. 2 shows that the data from any number of IP addresses may be used, that the range of daily query counts may be extreme, and that patterns do seem to exist.

Figure 3:
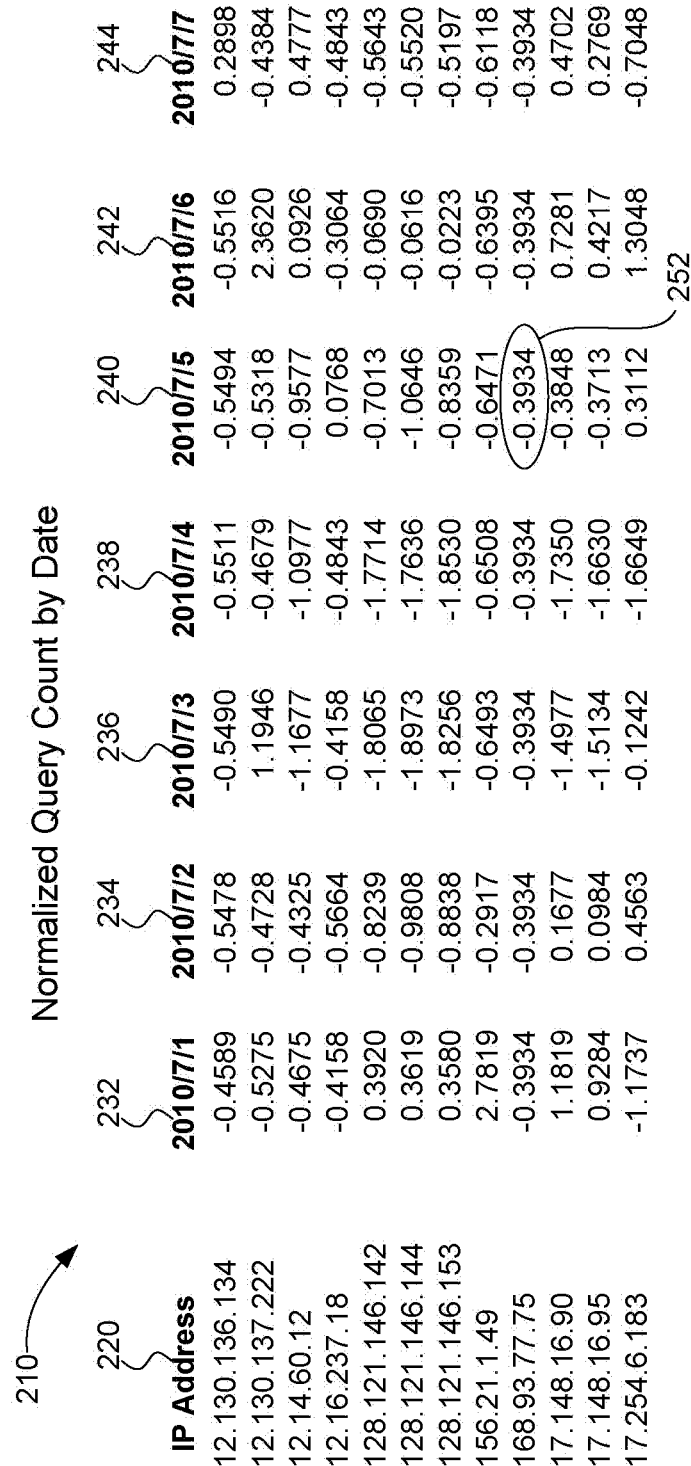
FIG. 3 is a normalized query log in which the data from the log has been normalized.

FIG. 3 is a normalized query log 210 in which the data from log 10 has been normalized. IP addresses are shown in column 220 and daily normalized values are shown in columns 232-244. For example, on Jul. 5, 2010 the value −0.3934 shown at reference 252 is the normalized query count value for IP address 168.93.77.75. The data may be normalized in any of a variety of manners. In one particular embodiment, the normalized value for a particular IP address is obtained using a standardized tool that uses the Z-score method and is obtained by subtracting the 31-day average for that IP address from the query count for a particular day and then dividing by the standard deviation of that 31-day period. The formula appears as follows:

$Z(i)=(x(i)-\mu)/\sigma$, where $\sigma$ is the standard deviation, $\mu$ is the 31-day average, $x(i)$ is the query count on a particular day, and $Z(i)$ is the resulting normalized value.

The standard deviation ($\sigma$) may be defined as:

$$\sigma = \sqrt{\frac{1}{N-1}\sum_{i=1}^{N}(x_i - \bar{x})^2}$$

where N is the number of days and $\bar{x}$ is the mean value. And, the 31-day average for IP address 12.130.137.222 (for example) is:

average ($\mu$)=(61+700+207148+ . . . )/31.

Other techniques for normalizing the data include applying distributions such as a Normal distribution or the Bernoulli distribution. For example, we can obtain the normalized value of a real-valued random variable x by computing the probability density function of the Normal distribution:

$$f(x) = \frac{1}{\sqrt{2\pi\sigma^2}} e^{\frac{-(x-\mu)^2}{2\sigma^2}}$$

where $\mu$ is the mean of the distribution and $\sigma$ is the standard deviation.

Figure 6:
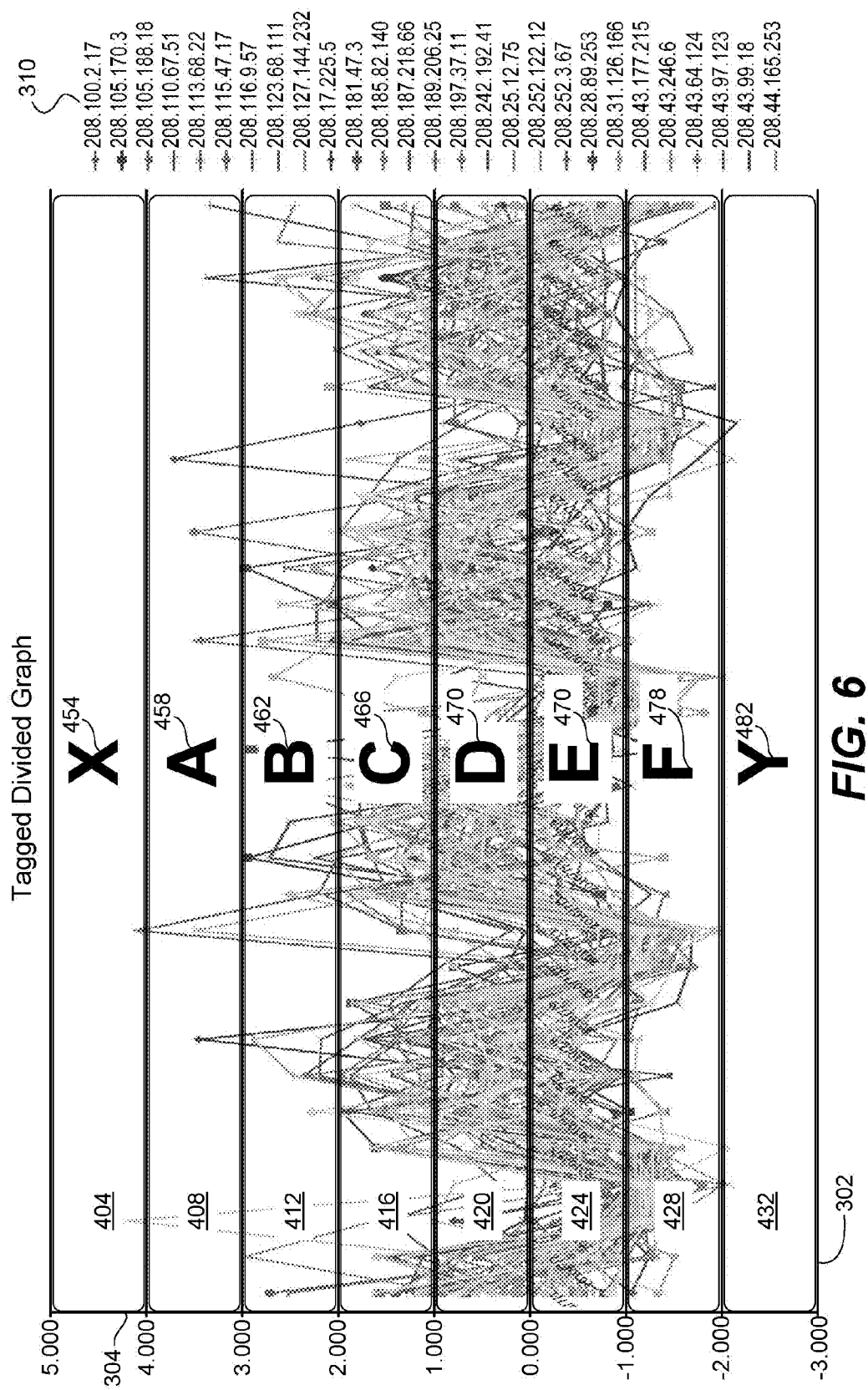
FIG. 6 is a tagged graph showing the divided, normalized data from FIG. 5 where each region has been tagged with a unique identifier or symbol.

Normalization of the data is not strictly necessary but can be very useful. For example, note the extreme range of query count values shown in FIG. 2 and also shown in FIG. 1. While some IP addresses have very low daily counts (IP address 12.14.60.12, ranging from 0 to 47), some IP addresses have very high and steady daily counts (IP address 128.121.146.144). Because the present invention (as described below) will use a pattern showing relative changes in the daily count for a particular IP address, it can be important to use normalized data. (FIG. 6 shows regions of the graph that have been tagged with unique identifiers for use in developing a pattern.) For example, referring to FIG. 1, while IP address 12.14.60.12 has very low daily counts, it may be quite relative (and indicative of spam) that the count changes from 6 on one day to 36 on the next day. If a single identifier is assigned to all count values below 100, it would appear that the pattern for this IP address is unchanging from day to day. Similarly, FIG. 2 shows that some of the IP addresses always have daily counts below 10,000. If a single identifier is assigned to all counts below 10,000 it would also appear that the pattern for these IP addresses does not significantly change from day to day when in fact there may be variations in the count value which are relevant.

While it may be possible to divide up a graph of data into hundreds or perhaps thousands of regions (unlike the eight regions shown in FIG. 5) and provide a very fine granularity, it is realized that normalizing the extreme data and dividing up the graph into about eight regions works well. Once the data is normalized, IP addresses that have very high daily count values may then be meaningfully compared to other IP addresses (and patterns) having low daily count values. Of course, if a query log contains data from IP addresses that appears essentially normalized, i.e., extreme ranges do not exist, then it may not be necessary to normalize the data.

Figure 4:
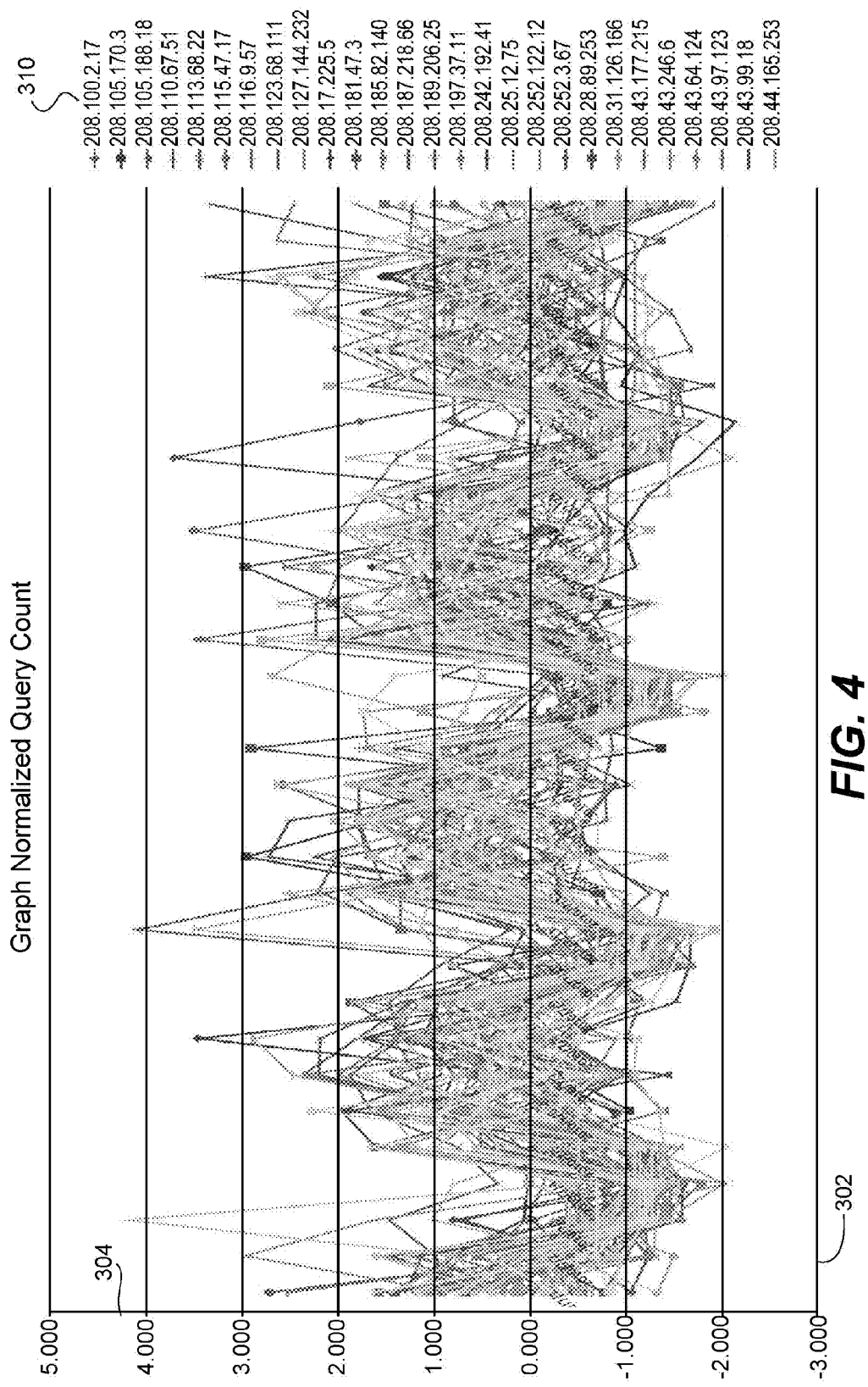
FIG. 4 is a graph of the normalized query count values.

FIG. 4 is a graph of the normalized query count values, for example, using data from a log such as normalized query log 210. In this example, the data of the graph of FIG. 4 may not correspond exactly to the partial log example shown in the FIG. 3. In any case, FIG. 4 shows an x-axis 302 representing normalized daily query count values for the month of July ranging on a y-axis 304 from about −2 up to about 4. The IP addresses represented in the graph are shown at column 310 and the normalized data for each IP address is represented by a unique line in the graph. This normalized data is now ready to be divided up into regions.

Figure 5:
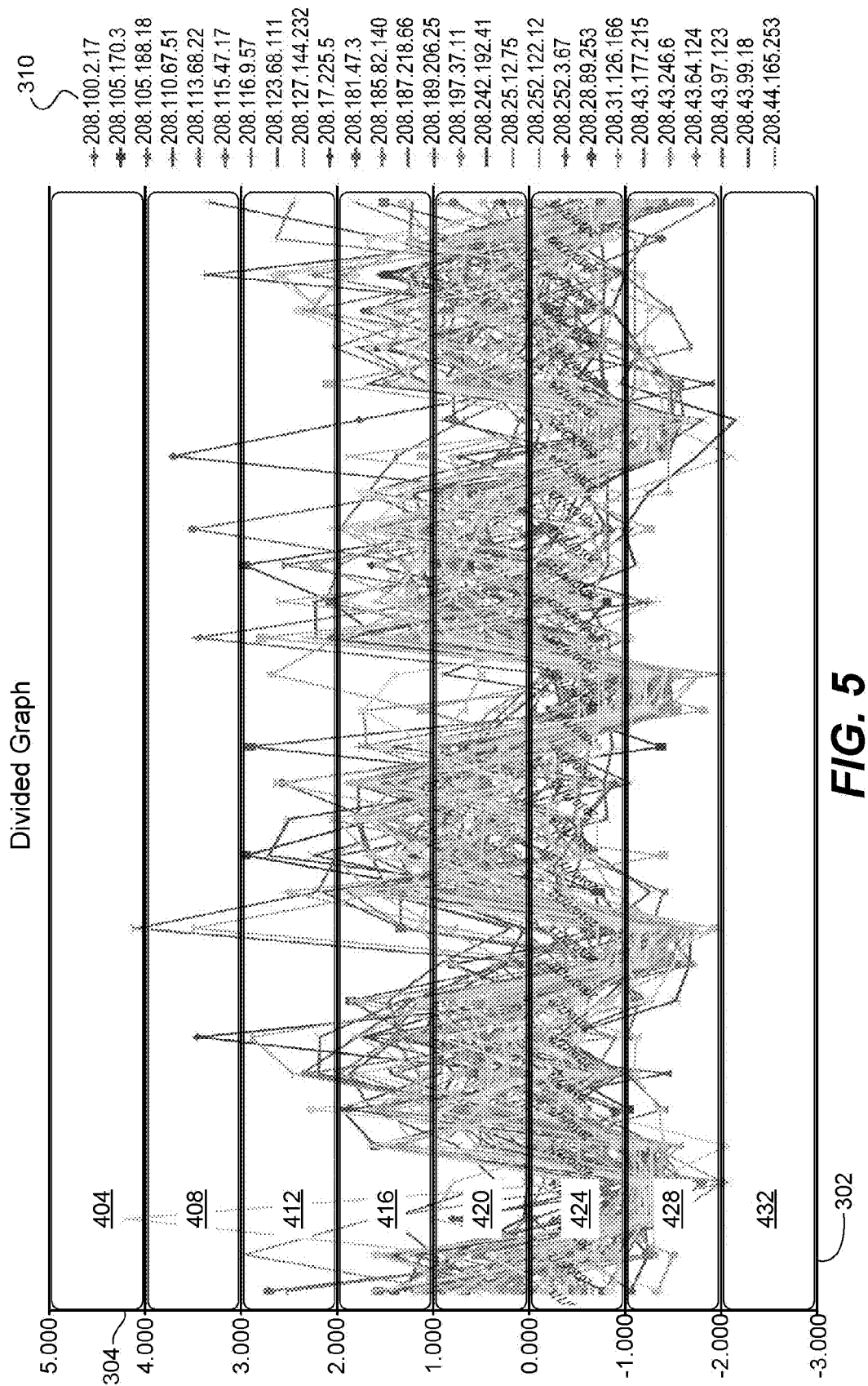
FIG. 5 is a graph showing the normalized data from FIG. 4 that has been divided up into regions.

FIG. 5 is a graph showing the normalized data from FIG. 4 that has been divided up into regions. As shown, there are eight regions 404-432 each representing a range having an absolute value of 1. For example, region 412 represents those data values being in the range from 2 up to 3, while region 428 represents those data values being in the range from −1 down to −2. Thus, for example, region 420 represents all those IP addresses each having a daily count normalized value that falls within the range from 0 up to 1. It has been determined that using 8 regions best represents the normalized data and that regions 408-428 represent roughly 95% of the data using a six standard deviation, and that regions 408 and 432 represent the remaining 5% of outlying data. Of course, a fewer or a greater number of regions may be used and the data may be distributed throughout these regions using different percentages.

These regions may also be represented each having a different color or background as an aid to visualizing and implementing the invention, although such a representation is not necessary.

FIG. 6 is a tagged graph showing the divided, normalized data from FIG. 5 where each region has been tagged with a unique identifier or symbol. As shown, each of regions 404-432 has been tagged with a unique identifier 454-482. For example, region 428 has been tagged with the identifier "F." Of course, each region may be tagged with any type of identifying number, letter, symbol, color, etc., that uniquely identifies each region. Now that each region has been tagged with a particular identifier, a pattern over time may be developed for each IP address showing how its query count changes from day to day. For example, an IP address having a normalized query count on day one falling in the range of 3-4 would be assigned the identifier "A." If on day two the query count for that IP address now falls in the range of 0 to −1, it would be assigned the identifier "E" and the pattern to date for that IP address would be "AE." In this fashion, a pattern representing the normalized daily count value for each IP address shows how the total of sent e-mail messages for that particular IP address changes from day to day. It is realized that such a pattern from a malicious computer (such as a spammer, etc.) may be matched against the pattern from an unknown IP address in order to predict the behavior of that unknown IP address.

FIG. 7 shows the development 500 of patterns for unknown IP addresses. Six IP addresses are shown each followed by their corresponding pattern for a particular time period, for example, patterns 502-512 are shown. In this example, if the tagged regions of FIG. 6 are each represented by a unique color, then patterns 502-512 would each show a pattern of changing colors (or of grayscale changes). Pattern 508 has been annotated with the corresponding identifier letter for each region showing the pattern that may be developed. Thus, the pattern 508 for this particular IP address over a 16-day time period is "YADYDCEACXYFBADD." The lower half of this example 500 now shows the corresponding letter pattern 522-532 for each of the IP addresses. (Pattern 528 does not match pattern 508 because it is for a different time period.) Thus, it is shown that a pattern of any length for each IP address may be developed using letters or any other unique identifying symbol showing how the query count changes for that IP address over time. Once patterns are developed for any number of IP addresses whose reputation is unknown, each of these patterns may be compared with patterns from known, good mail transfer agents, or with known, bad mail transfer agents in order to predict the behavior of these unknown IP addresses.

Figure 8:
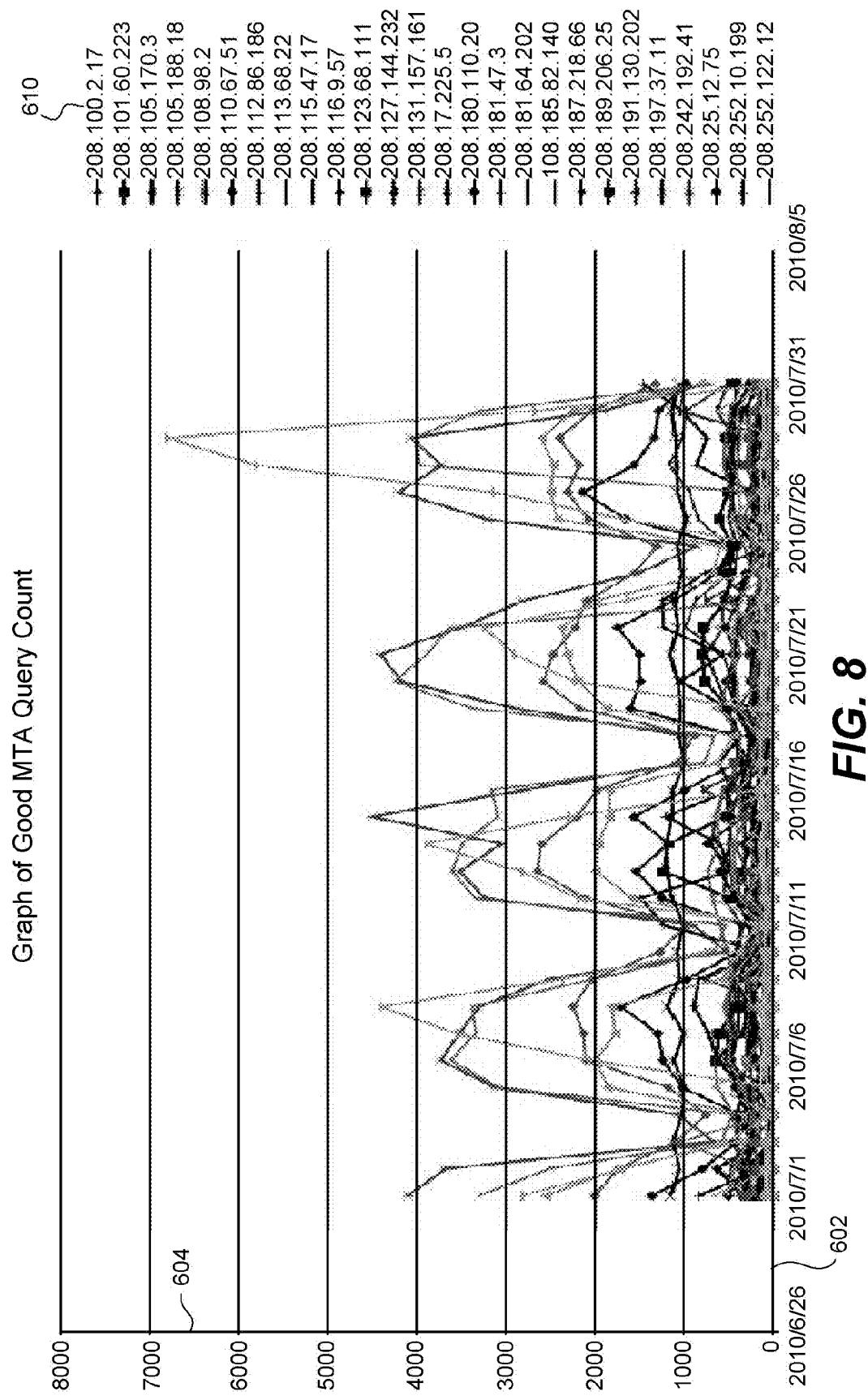
FIG. 8 is a graph of query count values obtained from known, good mail transfer agents.

FIG. 8 is a graph of query count values obtained from known, good mail transfer agents. In other words, the IP addresses listed in column 610 are represented in the graph and are IP addresses of mail transfer agents (or other computers) that are known not to be malicious or known not to be spammers. These values extend 602 for the month of July and range 604 from 0 up to about 7,000, and may be obtained from a customer query log or from any other suitable source of e-mail messages sent from good mail transfer agents. Using the above techniques, one may then take this good query count data, normalize it, divide it into regions, tag the regions, and develop a pattern for each of the IP addresses, such as those patterns shown in FIG. 10. An IP address may be determined to be a good IP address by a simple test. For example, before an MTA connection, the MTA queries "HELLO" first (e.g., at www.ibm.com). Then, we can compare the HELLO with their RDNS (RDNS is used to query the domain name of an IP address). If those match, we can assume that the MTA is good. Other techniques may also be used to determine a good IP address.

Figure 9:
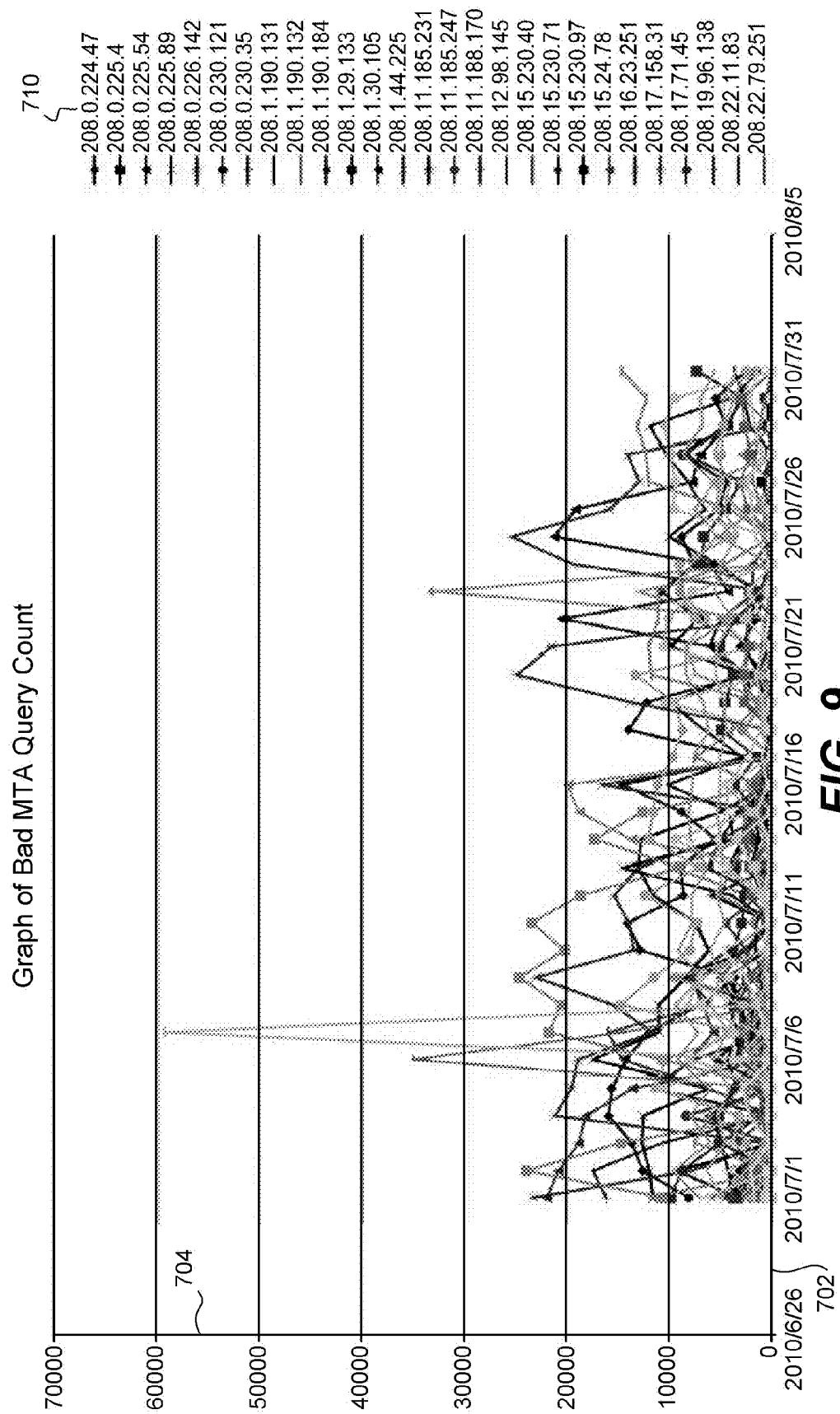
FIG. 9 is a graph of query count values obtained from known, bad mail transfer agents.

FIG. 9 is a graph of query count values obtained from known, bad mail transfer-agents. In other words, the IP addresses listed in column 710 are represented in the graph and are IP addresses of mail transfer agents (or other computers) that are known to be malicious or known to be spammers. These values extend 702 for the month of July and range 704 from 0 up to about 60,000, and may be obtained from a customer query log or from any other suitable source of e-mail messages sent from bad mail transfer agents. Using the above techniques, one may then take this bad query count data, normalize it, divide it into regions, tag the regions, and develop a pattern for each of the IP addresses, such as those patterns shown in FIG. 11. An IP address may be determined to be a bad IP address using a variety of techniques. For example, as mentioned above, if an MTA sends too much spam to a honey pot, we will assume it is bad. Then, we can retrieve its query behavior as an example of a bad behavior pattern.

FIG. 10 is an example of daily query count behavior patterns obtained from known, good mail transfer agents. For example, these patterns may be obtained from the data represented in FIG. 8. As shown, individual IP addresses 802-810 each have a corresponding pattern of behavior 812-820 that stretches over time, such as over days, weeks or months. As will be described below, a common pattern 822-830 for good behavior has been discovered in each of these patterns of behavior 812-820.

FIG. 11 is an example of daily query count behavior patterns obtained from known, bad mail transfer agents. For example, these patterns may be obtained from the data represented in FIG. 9. As shown, individual IP addresses 852-860 each have a corresponding pattern of behavior 862-870 that stretches over time, such as over days, weeks or months. As will be described below, a common pattern 872-880 for bad behavior has been discovered in each of these patterns of behavior 862-870.

At this point in time, a good behavior pattern 812 has been identified and a bad behavior pattern 862 has also been identified. In addition, behavior patterns 522-532 for various mail transfer agents of unknown reputation (shown in FIG. 7) have also been identified. While only a subset of potential IP addresses are shown in FIGS. 10 and 11, the invention may analyze hundreds or even thousands of IP addresses to determine known, good patterns and known, bad patterns. Accordingly, while only a single good pattern 822 and a single bad pattern 872 are shown, there may be any number of good patterns that are determined and any number of bad patterns that are determined from the IP addresses analyzed. What is output from this analysis is then referred to as a pattern pool, a set of known, good patterns and a set of known, bad patterns. These good and bad patterns may be determined using a suffix tree as described below. The invention next proceeds to compare these patterns from unknown IP addresses to the good or to the bad patterns to predict the reputation of the unknown IP addresses.

The unknown behavior patterns may be compared to the known behavior patterns using any suitable technique, for example, manually, visually, or using any suitable computer algorithm. In one embodiment of the invention, a suffix tree is used to compare these patterns. As known in the art, a suffix tree (also referred to as a PAT tree or position tree) is a data structure for representing a string that allows various string operations to be performed. For example, a suffix tree allows one to find the longest common substring of two strings, search for substrings, etc. Other techniques instead of the suffix tree may be used to perform the matching such as a suffix array, an FM-INDEX, etc.

In one embodiment of the invention, a first suffix tree is first constructed using all of the known, bad behavior patterns (such as sequences 862-870) and then this suffix tree is used to determine the longest common substring from within these sequences (such as determining pattern 872). In a specific example, it has been determined that a common substring having a length of 14 is optimal and thus this first suffix tree is used to determine a common substring from within the bad behavior patterns that has a length of 14 identifiers. Next, the unknown behavior patterns (such as sequences 522-532) are fed into this first suffix tree and the tree is used to determine if any of these unknown patterns include the common substring with a length of 14. If so, then the IP address corresponding to the behavior pattern that includes the common substring is identified as being a potentially malicious IP address (i.e., an IP address associated with a spammer, hacker, or other malicious individual).

Similarly, a second suffix tree may also be constructed using all of the known, good behavior patterns (such as sequences 812-820) and then this suffix tree is used to determine the longest common substring from within these sequences (such as determining pattern 822). Thus this second suffix tree is used to determine a common substring from within the good behavior patterns that has a length of 14 identifiers. Next, the unknown behavior patterns (such as sequences 522-532) are fed into this second suffix tree and the tree is used to determine if any of these unknown patterns include the common substring with a length of 14. If so, then the IP address corresponding to the behavior pattern that includes the common substring is identified as being a potentially good IP address (i.e., an IP address not associated with a spammer, hacker, or other malicious individual).

A common substring having a length of 14 identifiers has been chosen because it has been determined that this length is best at reducing false positives and at increasing the detection rate of malicious IP addresses. While it is unlikely that an unknown behavior pattern will match both a common substring from the good behavior patterns and a common substring from the bad behavior patterns, should this occur the associated IP address is flagged as a potentially malicious address.

Once an unknown IP address has been characterized as good, bad, or still unknown, then an output message, alert or other may be generated. Typically, the system provides an IP address list, and then a product installed on the customer side will query this list to determine whether to accept an SMTP connection or not.

Flow Diagram

Figure 12:
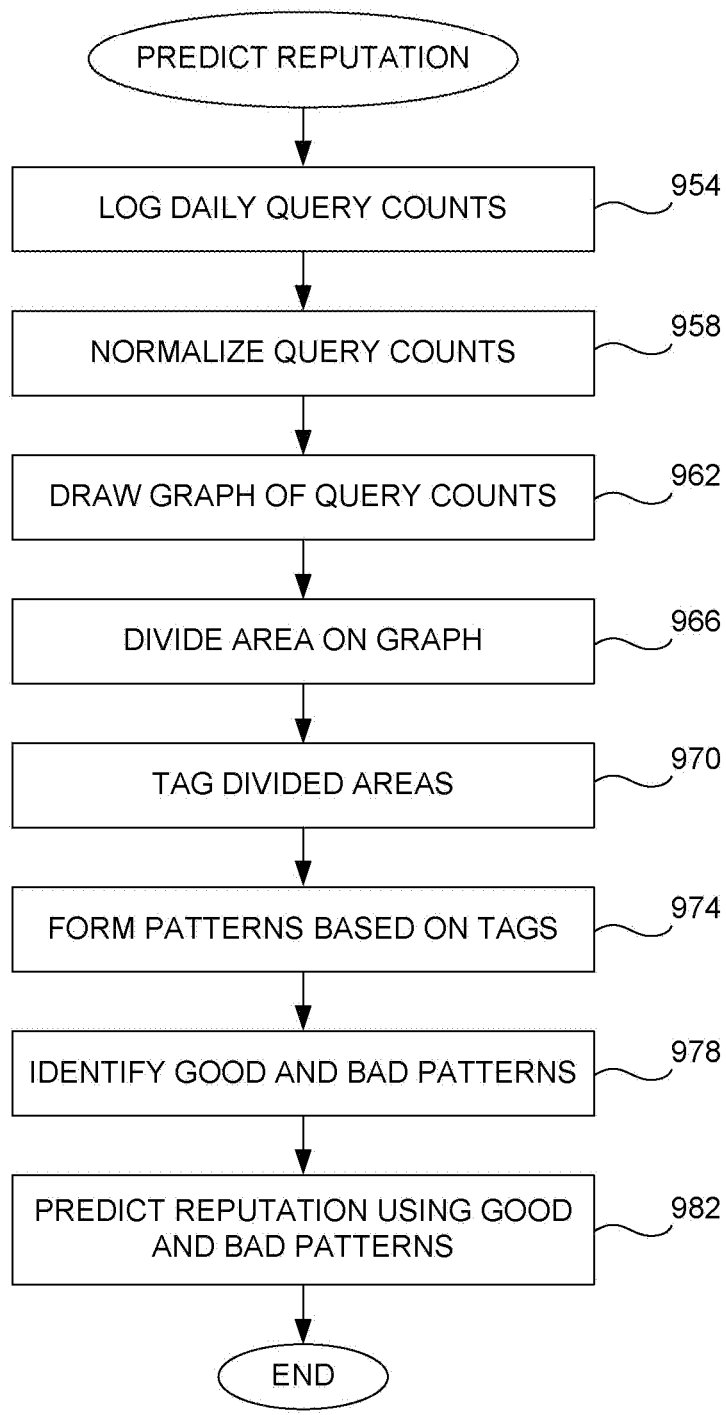
FIG. 12 is a flow diagram describing one embodiment for implementing the present invention.

FIG. 12 is a flow diagram describing one embodiment for implementing the present invention. In step 954 the daily query counts for e-mail messages are collected and logged such as shown and described above with respect to FIGS. 1 and 2. This data may be plotted as shown in FIG. 2. In step 958 the logged query count data may optionally be normalized such as shown and described above with respect to FIG. 3. In step 962 the normalized query count data may optionally be plotted as shown and described above with respect to FIG. 4. In step 966 the normalized data (or the plotted normalized data) may be divided into regions (numerically or graphically) such as shown and described above with respect to FIG. 5. In step 970 the divided regions may be tagged (symbolically or graphically) such as shown and described above with respect to FIG. 6. In step 974 patterns for each unknown IP address may be formed based upon the tagged regions such as shown and described above with respect to FIG. 7. In step 978 common good and bad patterns may be identified for known good and bad IP addresses such as shown and described above respect to FIGS. 8-11. In step 982 the reputation of unknown IP addresses may be predicted using these identified good and bad patterns such as described above using a suffix tree. Finally, an output identifying the determined reputations of these unknown 1P addresses is generated and output.

Block Diagram

Figure 13:
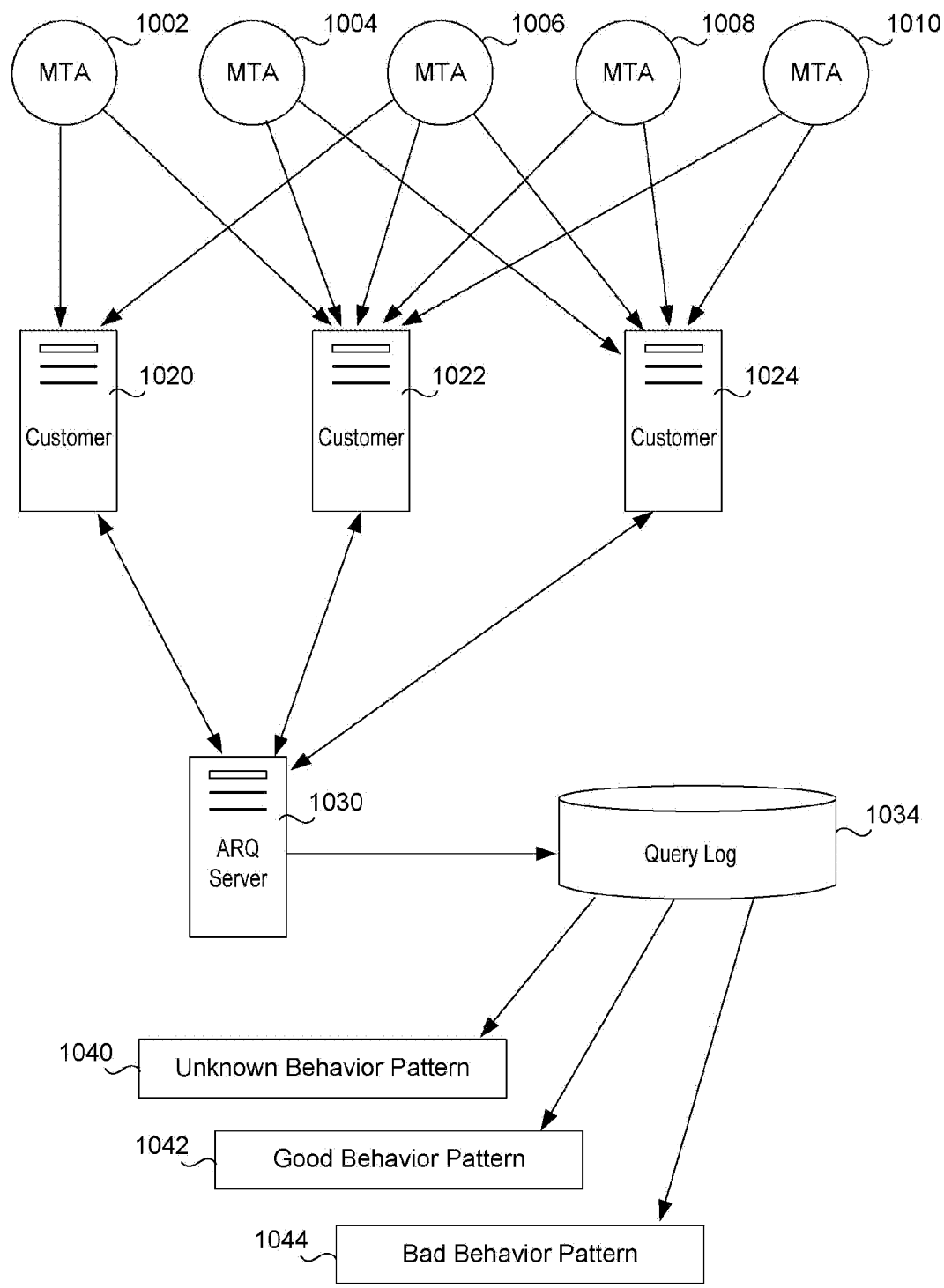
FIG. 13 is a block diagram illustrating one specific embodiment for generating the query log and implementing the present invention.

As mentioned above, the query log or database of count values may be developed in a wide variety of manners. FIG. 13 is a block diagram illustrating one specific embodiment for generating the query log and implementing the present invention. Any number of customer computer servers 1020-1024 (such as a mail server, etc.) receive e-mail messages from any number of mail transfer agents 1002-1010 over a period of time. These mail transfer agents may be other types of computers and it is not necessarily an e-mail message that is sent. Upon receipt of an e-mail message from a particular MTA, customer computer 1020 (for example) sends a query to the ARQ server 1030 asking if the IP address from which the message originated is good, bad, unknown or otherwise. Over the course of time, these customer computers will log a multitude of queries for any number of mail transfer agents and their corresponding IP addresses. This log of query counts by IP address and date is stored in a query log database 1034 by the ARQ server. In accordance with the steps detailed above, the present invention may then derive good and bad behavior patterns 1042 and 1044 and any unknown behavior patterns 1040 from this query log. An unknown behavior pattern is then compared to the good behavior patterns and the bad behavior patterns in order to predict the behavior of the unknown IP address.

Applicability to Other Services

The above description has used the example of an e-mail reputation service to perform an analysis of unknown IP addresses (such as mail transfer agents) to determine their reputations. The present invention is also applicable to a wide range of other services such as a Web reputation service, a file reputation service, an analysis of particular URLs, domains, computer servers, or other type of network traffic. In fact, any type of computer activity that can be represented in a daily (or other time period) count for each computer or device such as shown in FIG. 2 may be suitable for analysis using the present invention.

Computer System Embodiment

Figure 14A:
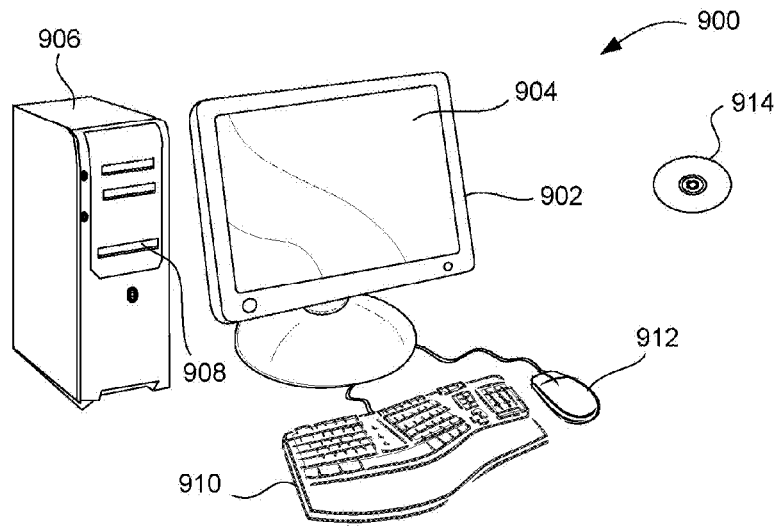
FIGS. 14A and 14B illustrate a computer system suitable for implementing embodiments of the present invention.
Figure 14B:
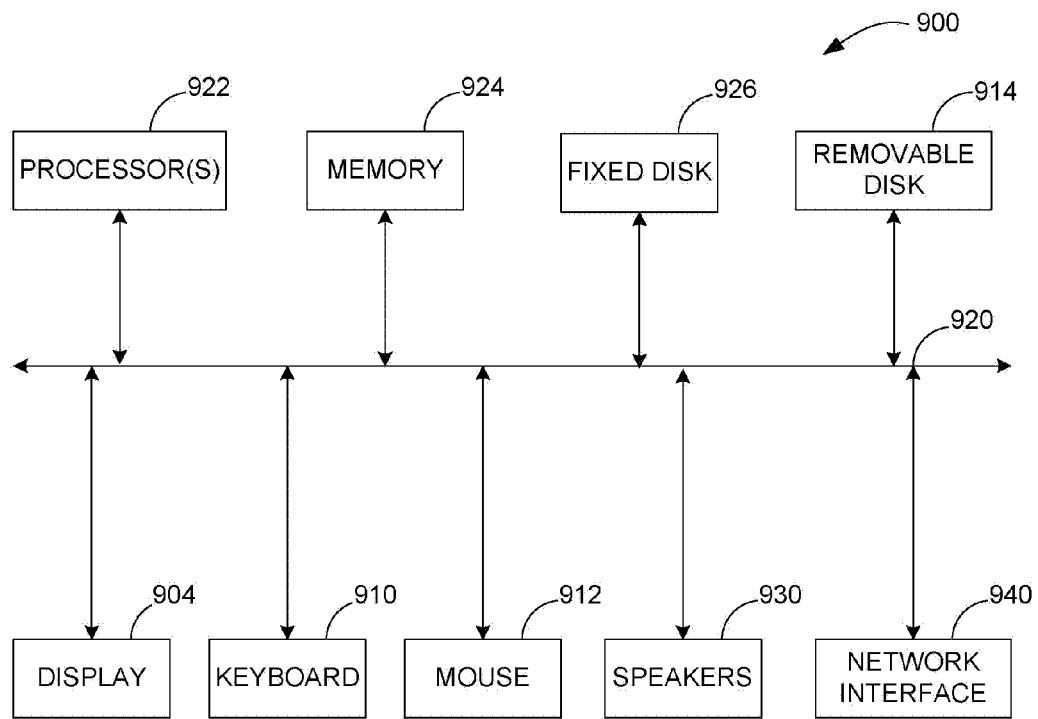

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of predicting the reputation of a single computer network resource, said method comprising:
   for said computer network resource having an unknown reputation, receiving count values of computer network traffic originating periodically from said single computer network resource;
   identifying a plurality of unique symbolic identifiers, each symbolic identifier representing a unique numerical range of possible count values;
   assigning to each of said count values one of said symbolic identifiers, said each count value falling within the unique numerical range of said assigned symbolic identifier;
   forming a chronological sequence of said assigned symbolic identifiers for said computer network resource of unknown reputation, said chronological sequence ordered based upon when said computer network traffic originates;
   receiving a fixed sequence of a subset of said symbolic identifiers that represents computer network traffic of a known network resource identified as being malicious;
   determining that said fixed sequence matches with a substring of said chronological sequence; and
   when it is determined said fixed sequence matches, outputting an indication of said match.

2. A method as recited in claim 1 wherein said computer network resource is an IP address, a URL, a domain, a computer server or a Web site.

3. A method as recited in claim 1 further comprising:
   normalizing said received count values before assigning said symbolic identifiers.

4. A method as recited in claim 1 further comprising:
   receiving a second fixed sequence of a subset of said symbolic identifiers that represents computer network traffic of a second known network resource identified as being benevolent;
   determining whether said second fixed sequence matches with a substring of said chronological sequence.

5. A method as recited in claim 1 further comprising:
   receiving a plurality of malicious sequences of symbolic identifiers, each of said malicious sequences being associated with a network resource identified as being malicious; and
   determining a common substring of said malicious sequences as being said fixed sequence.

6. A method as recited in claim 1 further comprising:
   outputting a reputation of said single computer network resource.

7. A method of predicting the reputation of an IP address, said method comprising:
   for said IP address having an unknown reputation, receiving count values of e-mail messages sent periodically from said IP address;
   identifying a plurality of unique symbolic identifiers, each symbolic identifier representing a unique numerical range of possible count values;
   assigning to each of said count values one of said symbolic identifiers, said each count value falling within the unique numerical range of said assigned symbolic identifier;
   forming a chronological sequence of said assigned symbolic identifiers for said IP address of unknown reputation, said chronological sequence ordered based upon said periodic sending of said e-mail messages;
   receiving a fixed sequence of a subset of said symbolic identifiers that represents e-mail messages sent from a known IP address identified as being malicious;
   determining that said fixed sequence matches with a substring of said chronological sequence; and
   when it is determined said fixed sequence matches, outputting an indication of said match.

8. A method as recited in claim 7 further comprising:
   normalizing said received count values before assigning said symbolic identifiers.

9. A method as recited in claim 7 further comprising:
   receiving a second fixed sequence of a subset of said symbolic identifiers that represents computer network traffic of a second known IP address identified as being benevolent;
   determining whether said second fixed sequence matches with a substring of said chronological sequence.

10. A method as recited in claim 7 further comprising:
    receiving a plurality of malicious sequences of symbolic identifiers, each of said malicious sequences being associated with an IP address identified as being malicious; and
    determining a common substring of said malicious sequences as being said fixed sequence.

11. A method as recited in claim 7 wherein said fixed sequence of symbolic identifiers has a length of 14 identifiers.

12. A method as recited in claim 7 wherein said identifying includes eight contiguous unique numerical ranges.

13. A method as recited in claim 7 further comprising:
    outputting a reputation of said IP address.

14. A method of predicting the reputation of a target IP address, said method comprising:
    identifying a plurality of unique symbolic identifiers, each symbolic identifier representing a unique numerical range of possible count values;
    receiving a plurality of sequences of a subset of said symbolic identifiers, each of said sequences associated with an IP address identified as being malicious and each symbolic identifier in said sequences representing a count value of e-mail messages sent from said malicious IP address in a time period;

determining a common substring of said sequences;

for said target IP address having an unknown reputation, receiving target count values of e-mail messages sent periodically from said target IP address;

assigning to each of said target count values one of said symbolic identifiers, said each target count value falling within the unique numerical range of said assigned symbolic identifier;

forming a target chronological sequence of said assigned symbolic identifiers for said target IP address of unknown reputation, said target chronological sequence ordered based upon said periodic sending of said e-mail messages from said target IP address;

determining that said common substring matches with a substring of said target chronological sequence; and when it is determined said common substring matches, outputting an indication of said match.

15. A method as recited in claim 14 further comprising:

normalizing said received target count values before assigning said symbolic identifiers.

16. A method as recited in claim 14 wherein said common substring of symbolic identifiers has a length of 14 identifiers.

17. A method as recited in claim 14 wherein said identifying includes eight contiguous unique numerical ranges.

18. A method as recited in claim 14 further comprising:

aggregating said target count values from a plurality of customer computers that have received e-mail messages from said target IP address.

19. A method as recited in claim 14 further comprising:

determining that said common substring matches using a suffix tree.

20. A method as recited in claim 14 further comprising:

outputting a reputation of said IP address.

* * * * *